(12) United States Patent
Boschetto

(10) Patent No.: US 7,766,284 B2
(45) Date of Patent: Aug. 3, 2010

(54) MOUNTING APPARATUS FOR A WINDOW DECORATION AND WINDOW DECORATION INCLUDING THE SAME

(75) Inventor: Andrew Anthony Boschetto, Sewell, NJ (US)

(73) Assignee: International Marketing Corporation, Turnersville, NJ (US)

( * ) Notice: Subject to any disclaimer, the term of this patent is extended or adjusted under 35 U.S.C. 154(b) by 0 days.

(21) Appl. No.: 12/133,730

(22) Filed: Jun. 5, 2008

(65) Prior Publication Data

US 2009/0302184 A1    Dec. 10, 2009

(51) Int. Cl.
*A47G 7/00* (2006.01)
(52) U.S. Cl. .................. 248/27.8; 248/301; 248/304; 248/309.1; D26/9; 362/392; 428/10
(58) Field of Classification Search ............... 248/27.8, 248/690, 309.1, 315, 304, 339, 340, 310; 428/7, 10; 47/41.01; D26/9, 73, 96; 362/392, 362/396, 122, 810
See application file for complete search history.

(56) References Cited

U.S. PATENT DOCUMENTS

| 932,128 | A | * | 8/1909 | Houston | 248/104 |
|---|---|---|---|---|---|
| 1,812,116 | A | * | 6/1931 | Propp | 362/122 |
| 1,842,904 | A | * | 1/1932 | Greenan | 431/294 |
| 2,083,240 | A | * | 6/1937 | Pollock | 362/122 |
| 2,086,958 | A | * | 7/1937 | Pollock | 362/122 |
| 2,258,442 | A | * | 10/1941 | Brenner | 428/27 |
| 2,712,059 | A | * | 6/1955 | Allyn | 362/228 |
| 2,826,386 | A | * | 3/1958 | Conrad | 248/104 |
| 3,340,391 | A | * | 9/1967 | Heyden | 362/190 |
| 4,100,316 | A | * | 7/1978 | Lackey | 428/10 |
| 4,392,191 | A | * | 7/1983 | White, Sr. | 362/392 |
| D320,864 | S | * | 10/1991 | Boschetto | D26/73 |
| 5,165,790 | A | * | 11/1992 | Boschetto | 362/396 |
| 5,199,781 | A | * | 4/1993 | Sweeny | 362/145 |
| 5,383,633 | A | * | 1/1995 | Ellestad | 248/160 |
| 6,311,851 | B1 | * | 11/2001 | Knudsen et al. | 211/13.1 |
| 6,497,502 | B1 | * | 12/2002 | Clift et al. | 362/392 |
| D507,062 | S | * | 7/2005 | Boschetto | D26/9 |

* cited by examiner

*Primary Examiner*—Anita M King
(74) *Attorney, Agent, or Firm*—Berenato & White, LLC

(57) ABSTRACT

A wreath is provided. The wreath includes a candle holder having a support portion, a container having a recess extending from the support portion, and a first threaded portion extending from the support portion away from the container. A support wire formed into a ring shape is fixed to opposite sides of the candle holder such that the recess of the container faces toward a center of the ring shape. A plurality of plant components are arranged around the support wire, the plant components substantially obstructing the support wire from view. A coupling member has a second threaded portion. The coupling member is removably coupled to the candle holder via the first and second threaded portions. An engagement unit has a first end part held in position between the coupling member and the candle holder and a second end part held in position between a window and a window sill or a door and a threshold, and an elongated support bracket extending between the first end part and the second end part to support the wreath in a central portion of the window or door.

10 Claims, 7 Drawing Sheets

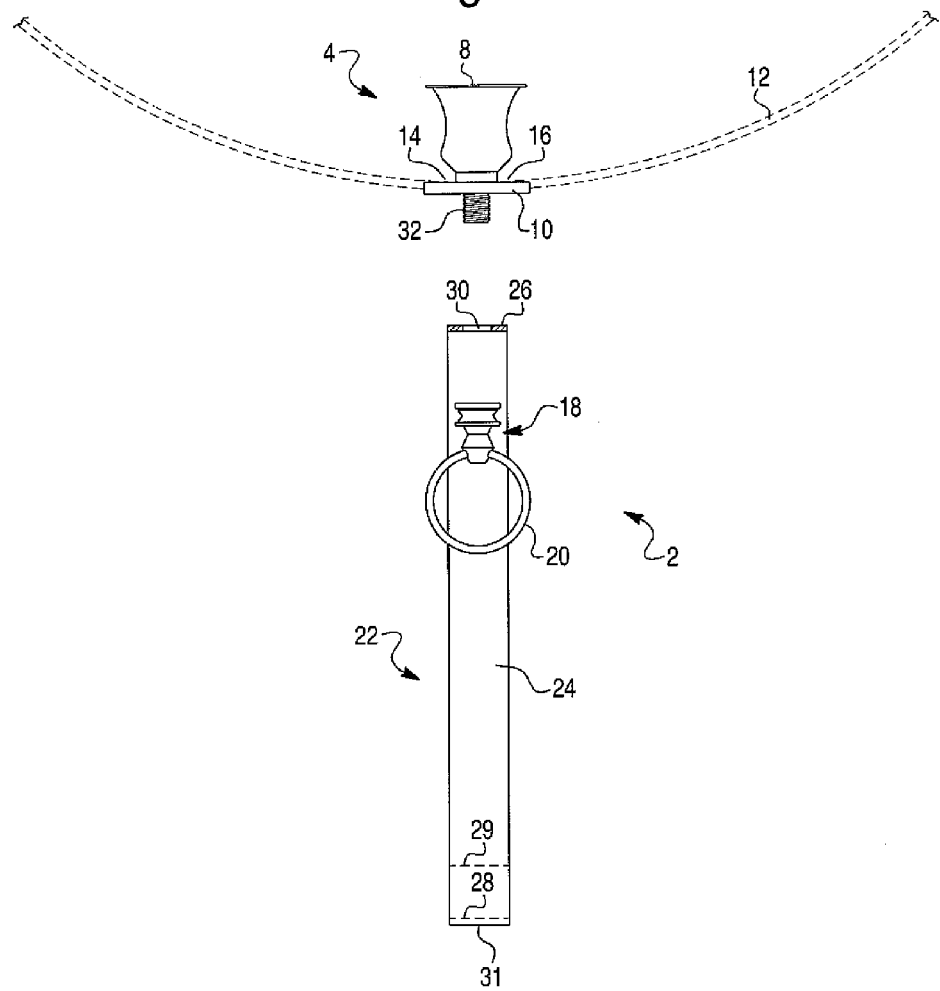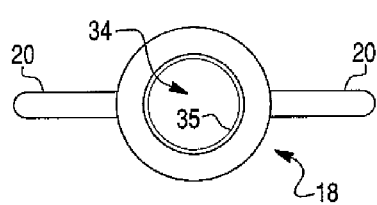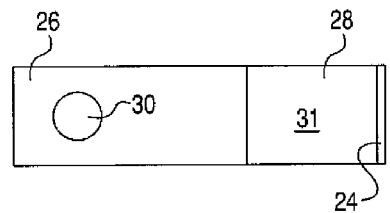

MOUNTING APPARATUS FOR A WINDOW DECORATION AND WINDOW DECORATION INCLUDING THE SAME

FIELD OF THE INVENTION

The present invention relates to a mounting apparatus for a window decoration and window decoration including the same. The present invention also relates to a method of mounting a window decoration.

BACKGROUND OF THE INVENTION

During various times of the year people mount various symbolic decorations throughout their homes. One such decoration is a wreath, which is typically mounted at Christmas time. A wreath typically includes pine needles (man-made or natural), flowers, berries, pine cones, or the like. Wreaths may be mounted on doors, in windows, or on walls. Candles are also sometimes mounted in windows during the Christmas season. However, it is believed that there are no commercially available window decorations that incorporate wreaths and candles together because of the obvious risk of fire.

Additionally, in order to mount a wreath in a window, a wreath is typically either hung by a string tie or positioned on the window sill and leaned against the window. However, using a string tie to mount the wreath may require a nail or other hanging device to be added to the window. Moreover, the string tie, which extends upwardly from the wreath may be visible, thereby detracting from the decorative value of the wreath. Finally, mounting the wreath using a string tie requires the user to do additional work including tying the string around the wreath, measuring the desired length of the string, cutting the string, mounting a hanging device on the window for supporting the wreath via the string tie. Accordingly, there is a need for an improved mounting apparatus for mounting a wreath in a window.

SUMMARY OF THE INVENTION

A wreath is provided. The wreath includes a candle holder having a support portion, a container having a recess extending from the support portion, and a first threaded portion extending from the support portion away from the container. A support wire formed into a ring shape is fixed to opposite sides of the candle holder such that the recess of the container faces toward a center of the ring shape. A plurality of plant components are arranged around the support wire, the plant components substantially obstructing the support wire from view. A coupling member has a second threaded portion. The coupling member is removably coupled to the candle holder via the first and second threaded portions. An engagement unit has a first end part to be held in position between the coupling member and the candle holder and a second end part held in position between a window and a window sill or a door and a threshold, and an elongated support bracket extending between the first end part and the second end part to support the wreath in a central portion of the window or door.

A mounting apparatus is also provided for mounting a decoration. The mounting apparatus includes a support bracket having an elongated vertical support with first and second opposite ends, and a U-shaped insert extending from the first end thereof. The insert is for disposal between a window and a window sill or a door and a threshold. A holder for supporting a decoration is removably connected to the second end of the vertical support.

A method of mounting a wreath is also provided. The wreath includes a candle holder with a support portion, a container having a recess extending upwardly from the support portion, and a first threaded portion extending downwardly from the support portion, a support wire formed into a ring shape being fixed to opposite sides of the candle holder, a plurality of plant components arranged around the support wire to substantially obstruct the support wire from view, a coupling member having a second threaded portion being removably coupled to the candle holder via the first and second threaded portions, and an engagement unit having a first end part to be held in position between the coupling member and the candle holder. The first end part has an accommodating portion for accommodating the first threaded portion and a second end part to be held in position between a window and a window sill or a door and a threshold. The engagement unit further includes an elongated support bracket extending between the first end part and the second end part. The method includes removing the coupling member from the candle holder by disengaging the first threaded portion from the second threaded portion, positioning the accommodating portion of the first end part of the engagement unit around the first threaded portion, coupling the second threaded portion of the coupling member to the first threaded portion such that the first end part of the engagement unit is retained between the coupling member and the candle holder, and positioning the second end part of the engagement unit between a window and a window sill or a door and a threshold so that the elongated support bracket supports the wreath in a central portion of the window or door, respectively.

BRIEF DESCRIPTION OF THE DRAWINGS

FIG. 2 is an exploded side elevational view of the mounting apparatus shown in FIG. 1;

FIG. 3A is a top plan view of a capping member shown in FIGS. 1 and 2;

FIG. 3B is a top plan view of a support bracket shown in FIGS. 1 and 2;

DETAILED DESCRIPTION OF THE INVENTION

Figure 1:
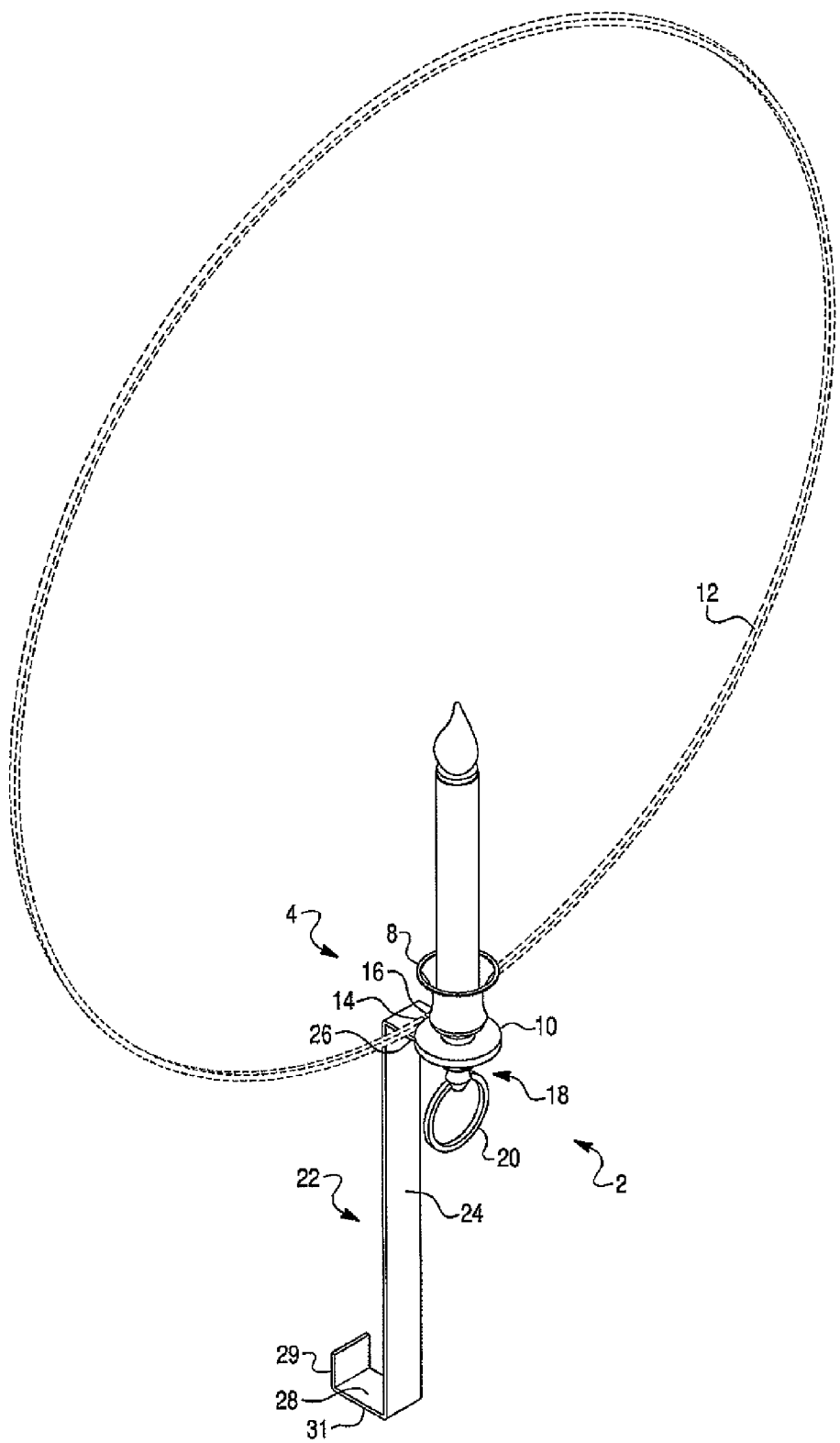
FIG. 1 is a side elevational view of a mounting apparatus according to an embodiment of the present invention.

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification.

As best shown in FIGS. 1 to 3B, a mounting apparatus 2 for a decoration 3 (see FIGS. 4 to 6) includes a candle holder 4 having a container 8 disposed on a support portion 10. The container 8 is shaped to hold an electronic candle lamp 11 (see FIG. 4). The support portion 10 may be a horizontal plate. A support wire 12 is formed into a ring with ends 14 and 16 secured to the support wire 12. The support wire 12 is shown in FIG. 1 in dashed lines. The ends 14 and 16 of the support portion 10 may be gradually tapered and flattened so as to be easily welded to the support portion 10. Alternatively, the ends 14 and 16 can be secured to the support portion 10 by another fastening element, e.g. a screw (not shown).

A capping member 18 is removably coupled to the support portion 10. The capping member 18 has a loop 20 disposed opposite to where the capping member 18 is coupled to the support portion 10. The loop 20 can be used to hang the decoration 3 (see FIG. 6).

Figure 4:
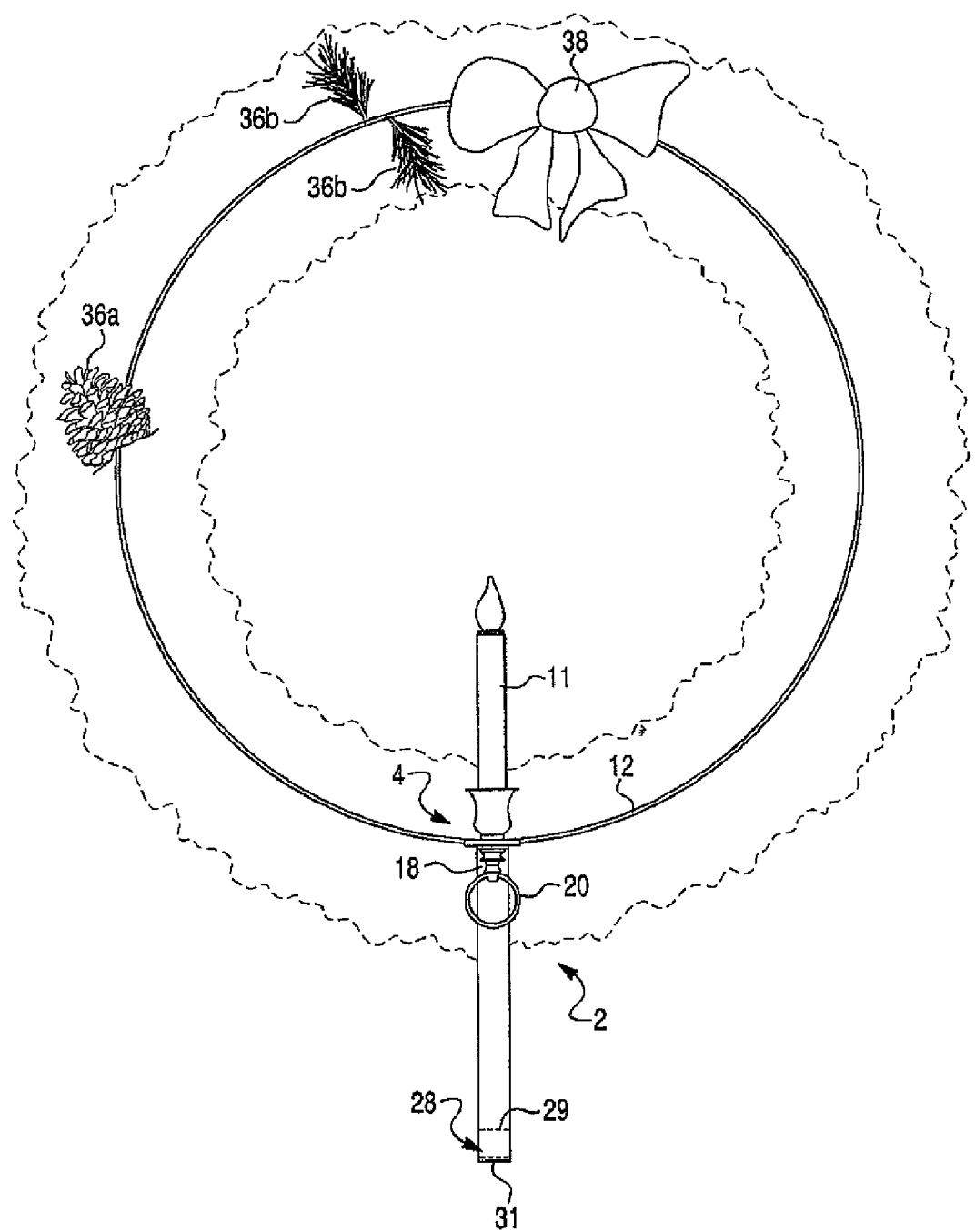
FIG. 4 is a front elevational view of a decoration according to an embodiment of the present invention.
Figure 5:
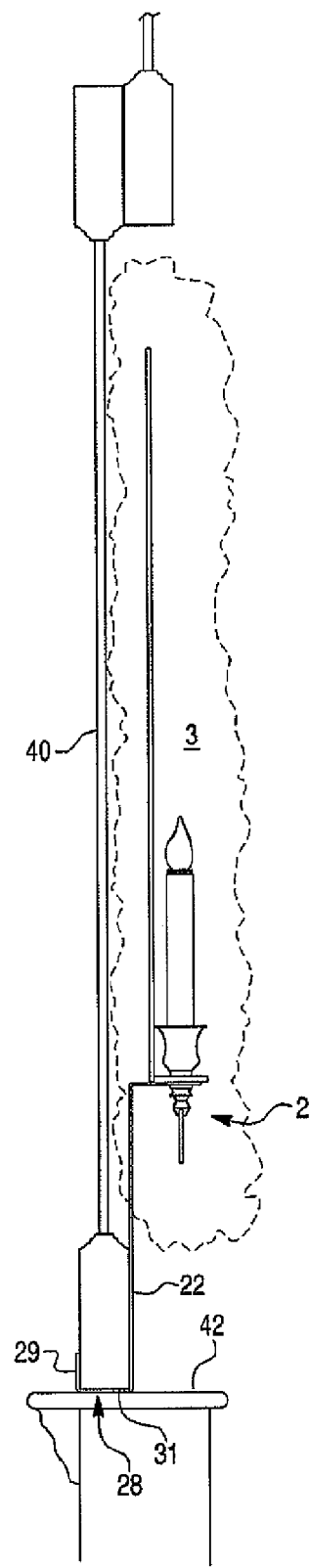
FIG. 5 is a partial side view of a decoration displayed in a window according to an embodiment of the present invention.

A support bracket 22 includes a vertical support 24 supporting the mounting apparatus 2 and decoration 3 (see FIG. 4 or 5). The support bracket 22 also includes a first end part 26 disposed at a first end of the vertical support 24 and a second end part 28 disposed at a second end of the vertical support 24. The second end part 28 includes an end plate 31 for retention between a window and a window sill or a door and a threshold, and a rear plate 29 for contacting the edge of the window or door. The vertical support 24, end plate 31 and rear plate 29 form a U-shaped bracket for accommodating the edge of the window or door (see FIGS. 5 and 7, respectively). That is, a window or door can be closed on the second end part 28 such that the support bracket 22 is retained in the upright position.

Figure 7:
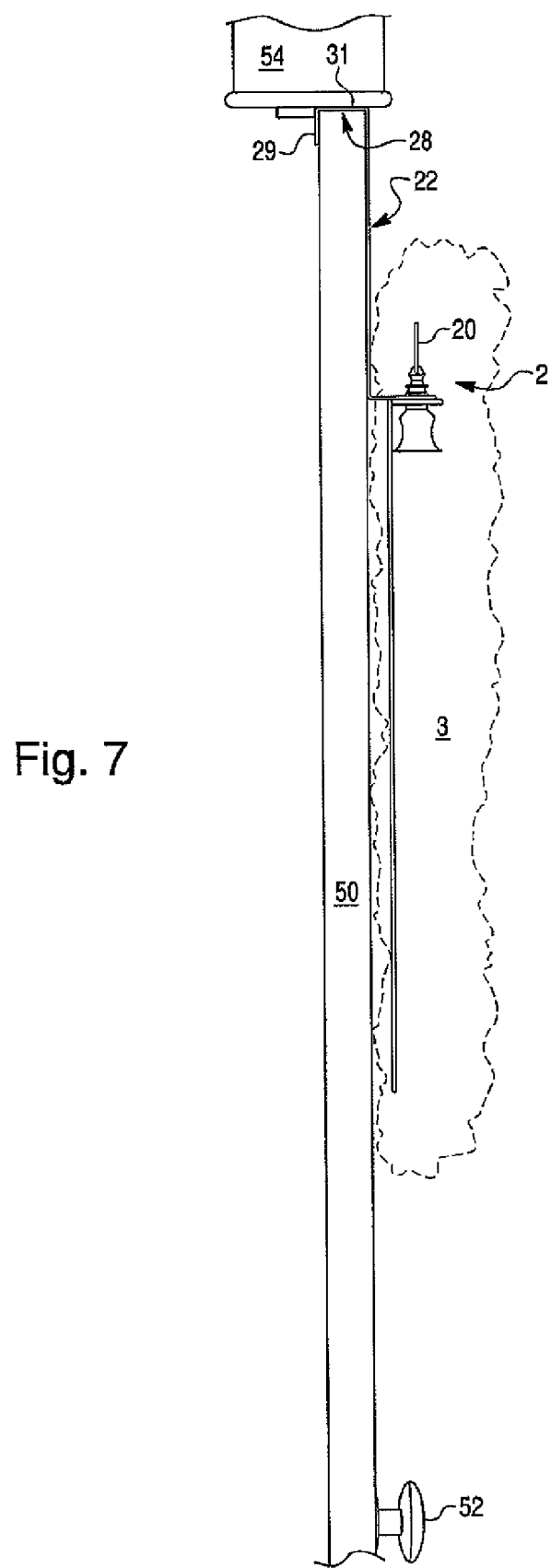
FIG. 7 is a partial side view of a decoration mounted on a door according to yet another embodiment of the present invention.
Figure 8:
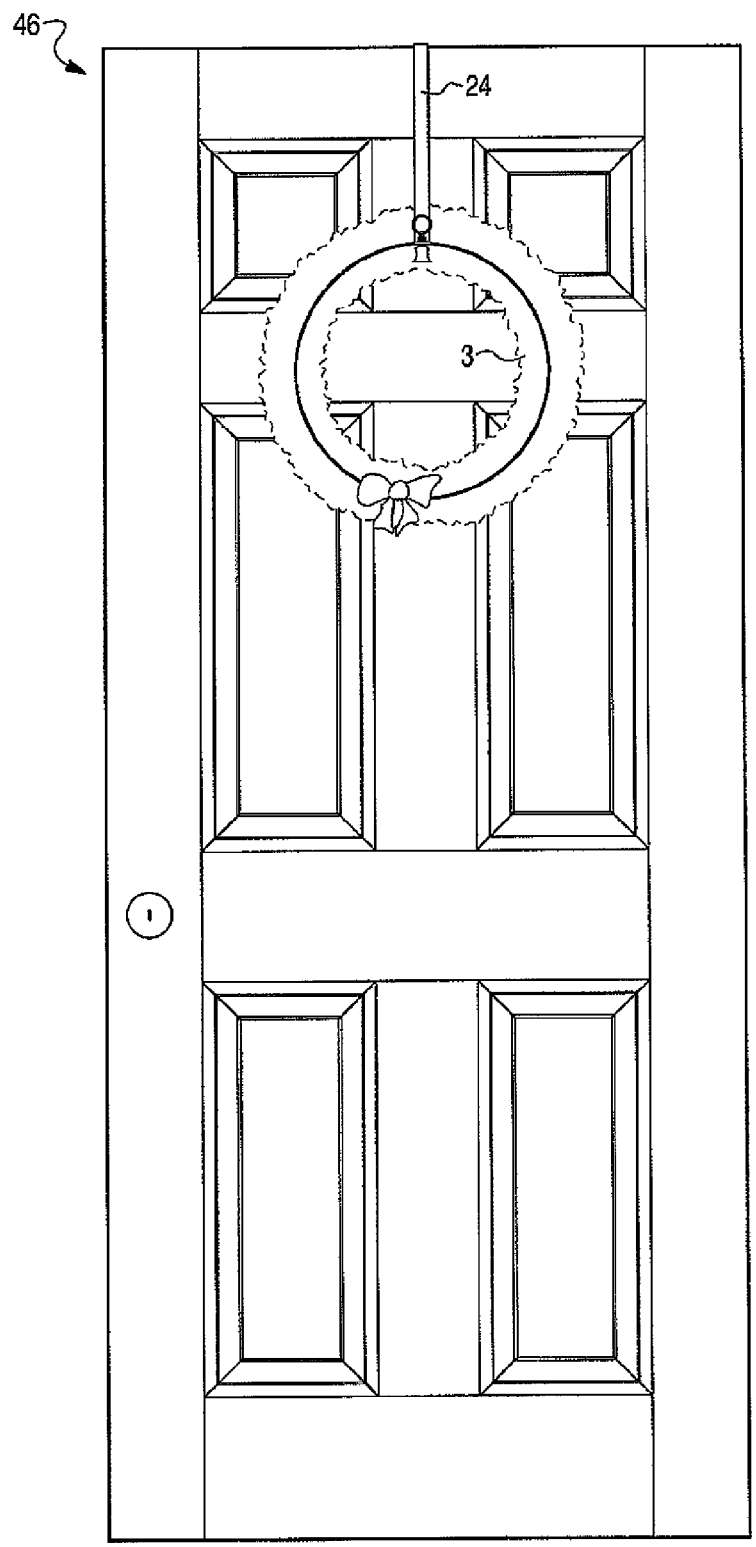
FIG. 8 is a front view of a decoration hung on a door according to another embodiment of the present invention.

The vertical support 24 is preferably between 6 and 12 inches long to support the decoration 3 in the central portion of a window. In particular, the vertical support 24 may be about 10 inches in length. The end plate 31 may be about 2 inches long in order to be able to accommodate the edge of a window or the edge of a door. Accordingly, the wreath 3 and mounting apparatus 2 can be easily mounted in a number of different ways. Specifically, as best shown in FIG. 7, the U-shaped bracket defined by the end plate 31, vertical support 24, and the rear plate 29 can be hung on an edge of a door 50 so that the wreath 3 is suspended in front of the door 50. Alternatively, as best shown in FIG. 5, the mounting apparatus 2 can be inverted so that the U-shaped bracket is positioned on a window sill 42 below an open window 40 so that the U-shaped bracket accommodates an edge of the window 40 when the window 40 is closed so that the wreath 3 is supported in front of the window 40.

The first end part 26 may be an intermediate coupling plate with an accommodating portion 30 extending therethrough. The accommodating portion 30 may be a hole extending through the intermediate coupling plate 26 as best shown in FIGS. 2 and 3B. Alternatively, the accommodating portion 30 may have other shapes. For example, the accommodating portion 30 may be a ring or a partial ring shape.

Also as best shown in FIG. 2, the candle holder 4 further includes a threaded rod 32 extending downwardly from the support portion 10. The threaded rod 32 is received in the hole 30 in the first end part 26. As best shown in FIG. 3A, the capping member 18 includes a recess 34 having an inner surface with a threading 35 for engaging the threaded rod 32 of the candle holder 4. Thus, when the threaded rod 32 is received through the hole 30 in the first end part 26, the capping member 18 can be screwed onto the candle holder 4 via the threaded rod 32 and threaded recess 34, 35 thereby securing the first end part 26 between the support portion 10 and the capping member 18.

As best shown in FIG. 4, the decoration 3 is supported by the mounting apparatus 2. The decoration 3 may be a wreath. The support wire 12 supports a plurality of plant components 36a and 36b. The plant components 36a and 36b may include pine needles, leaves, pine cones, flowers, berries, or the like. The outline of the wreath 3 is shown by dashed lines for simplicity sake. A bow 38 is optionally attached to the support wire 12 or plant components 36a and 36b. The electronic candle lamp 11 may be supported by the candle holder 4 so that the lamp 11 is in a central portion of the decoration 3, for example, in an opening in the wreath 3. Because the candle 11 is an electronic lamp that is secured in the container 8 of the candle holder 4, the mounting apparatus 2 does not create a fire hazard.

One of ordinary skill in the art should understand that the position of the threaded rod 32 and the inner surface threading 35 may be reversed without departing from the scope of the present invention. In this case, the recess 34 with the inner threading 35 may be formed on the bottom of the support portion 10 and the threaded rod 32 may be formed on the capping member 18 so that the inner threading 35 and the threaded rod 32 engage each other in a similar manner as described above. Similar to the embodiment shown in FIGS. 1 to 4, the treaded rod 32, which would extend from the capping member 18, would engage the hole 30 in the first end part 26 so that the first end part 26 is interposed between the candle holder 4 and the capping member 18. The capping member 18 may alternatively be referred to as a "coupling member" as it is removably coupled to the support portion 10 to retain the first end part 26 therebetween.

Figure 6:
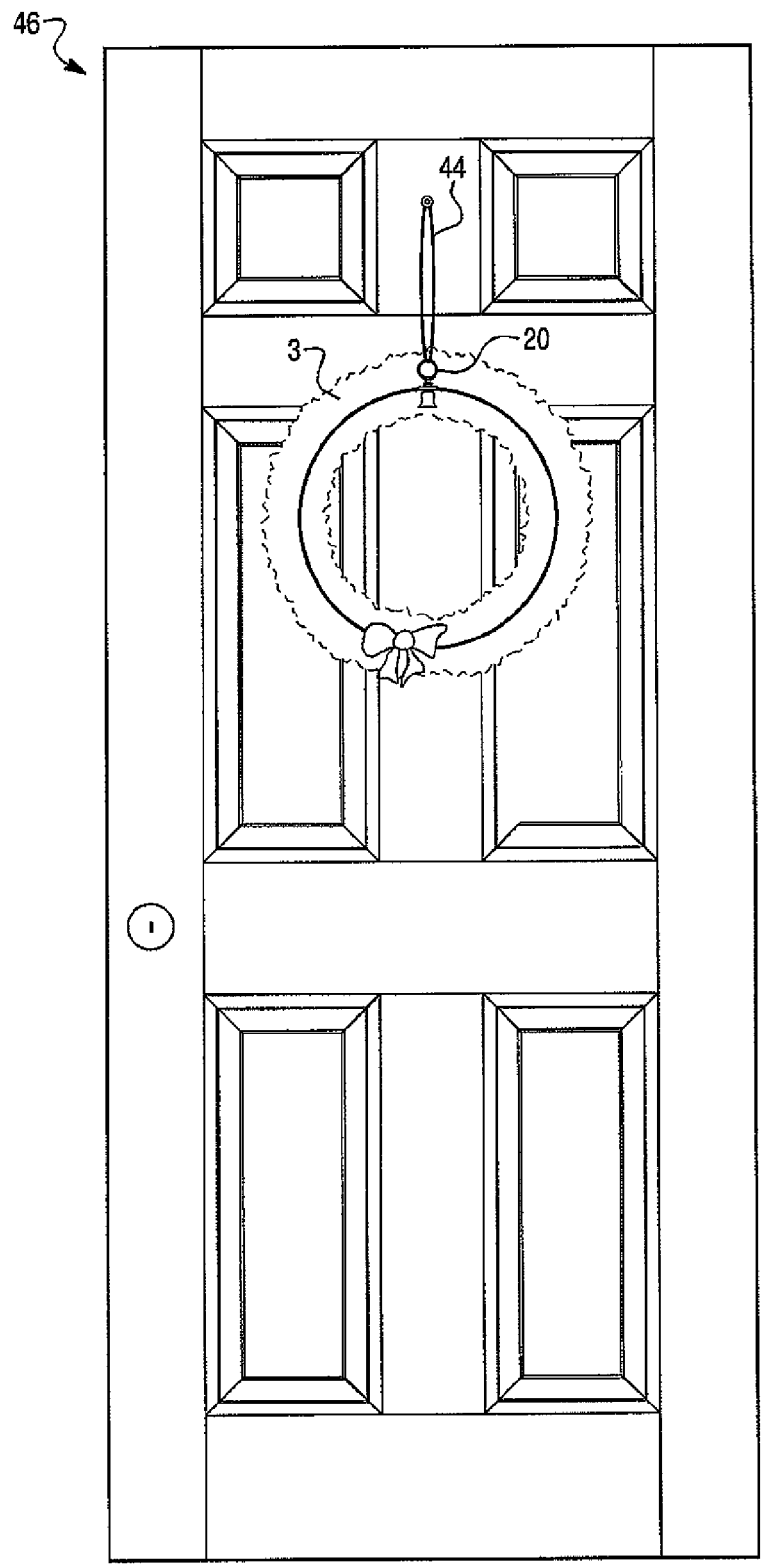
FIG. 6 is a front view of a decoration hung on a door according to an embodiment of the present invention.

As best shown in FIG. 5, the decoration 3 is mounted in a window 40 by the mounting apparatus 2. The second end part 28 is interposed between the window 40 and a window sill 42 so that the decoration 3 is displayed in a central portion of the window 40. The weight of the window 40 on the second end part 28 along with the accommodation of the edge of the window 40 in the U-shaped bracket formed by the end plate 31, rear plate 29, and vertical support 24 maintains the mounting apparatus 2 and decoration 3 in an upright position. As best shown in FIG. 6, the decoration 3 may alternatively be hung by the loop 20 of the mounting apparatus 2. For example, the decoration 3 may be hung by a cord 44 on a door 46. The loop 20 may also be used to suspend the decoration 3 from a ceiling. Accordingly, a user may easily mount the decoration 3 in a window, on a door, or on a wall or ceiling.

As best shown in FIG. 7, the wreath 3 may alternatively be hung on the door 50 above a knob 52 via the support bracket 22. In his case, the U-shaped bracket formed by the vertical support 24, the end plate 31, and the rear plate 29 is disposed on the edge of the door 50. The door 50 can then be closed and the wreath 3 is suspended in front of the door 50. That is, the second end part 28 of the mounting apparatus 2 is retained between the door and a threshold 54.

The decoration 3 may be a wreath, which is typically displayed during the holidays. However, it will be understood by one of ordinary skill in the art that other decorations can be mounted using the mounting apparatus 2.

Although embodiments of the present invention have been shown and described, it will be appreciated by those skilled in the art that changes may be made in these embodiments without departing from the principles and spirit of the invention, the scope of which is defined in the appended claims and their equivalents.

I claim:

1. A wreath, comprising:
   a candle holder having a support portion, a container having a recess extending from said support portion, and a first threaded portion extending from said support portion away from said container;

a support wire formed into a ring shape fixed to opposite sides of the candle holder such that said recess of said container faces toward a center of said ring shape;

a plurality of plant components arranged around said support wire, said plant components substantially obstructing said support wire from view;

a coupling member having a second threaded portion, said coupling member being removably coupled to said candle holder via said first and second threaded portions; and an engagement unit having a first end part held in position between said coupling member and said candle holder and a second end part to be held in position between a window and a window sill or a door and a threshold, and an elongated support bracket extending between said first end part and said second end part to support the wreath in a central portion of the window or door.

2. The wreath according to claim 1, wherein:

said first threaded portion comprises a cylindrical rod extending downwardly from said support portion, said cylindrical rod having threading arranged around an outer surface thereof; and said coupling member comprises a cap having a recess with threading arranged around an inner surface thereof, said recess receiving said cylindrical rod of said candle holder.

3. The wreath according to claim 1, wherein said support wire includes a first end and a second end welded to said support portion of said candle holder.

4. The wreath according to claim 1, wherein said first end part of said engagement unit comprises an intermediate coupling plate extending from a first end of said elongated support bracket in a first direction.

5. The wreath according to claim 4, wherein said second end part of said engagement unit comprises:

an end plate extending from a second end of said elongated support bracket in a second direction opposite to the first direction; and a rear plate extending from said end plate in a direction that is substantially parallel to the elongated support member, said end plate and rear plate forming a U-shaped bracket with said elongated support member.

6. The wreath according to claim 5, wherein said intermediate coupling plate and said end plate are approximately perpendicular to said elongated support bracket.

7. The wreath according to claim 4, wherein said intermediate coupling plate includes an accommodating portion through which said first threaded portion is arranged so that the intermediate coupling plate is maintained in position when the coupling member is coupled to the candle holder via the first threaded portion with the first plate therebetween.

8. The wreath according to claim 1, wherein said elongated support bracket is between about 6 inches and 12 inches in length.

9. The wreath according to claim 1, wherein said coupling member includes a loop disposed opposite to said second threaded portion, said loop extending away from where said candle holder is located.

10. A method of mounting a wreath having a candle holder with a support portion, a container having a recess extending from the support portion, and a first threaded portion extending from the support portion away from the container, a support wire formed into a ring shape being fixed to opposite sides of the candle holder, a plurality of plant components arranged around the support wire to substantially obstruct the support wire from view, a coupling member having a second threaded portion being removably coupled to the candle holder via the first and second threaded portions, and an engagement unit having a first end part to be held in position between the coupling member and the candle holder, the first end part having an accommodating portion for accommodating the first threaded portion and a second end part to be held in position between a window and a window sill or a door and a threshold, and an elongated support bracket extending between said first end part and said second end part, the method comprising:

removing the coupling member from the candle holder by disengaging the first threaded portion from the second threaded portion;

positioning the accommodating portion of the first end part of the window engagement unit around the first threaded portion;

coupling the second threaded portion of the coupling member to the first threaded portion such that the first end part of the window engagement unit is retained between the coupling member and the candle holder; and positioning the second end part of the engagement unit between a window and a window sill or a door and a threshold so that the elongated support bracket supports the wreath in a central portion of the window or door, respectively.

* * * * *